United States Patent
Haque et al.

(10) Patent No.: US 10,476,050 B2
(45) Date of Patent: Nov. 12, 2019

(54) APPARATUS COMPRISING PROTON BATTERY CELLS AND A REMOVABLE BARRIER LAYER

(71) Applicant: Nokia Technologies Oy, Espoo (FI)

(72) Inventors: Samiul Haque, Cambridge (GB); Di Wei, Cambridge (GB); Stefano Borini, Cambridge (GB); Salvatore Zarra, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 129 days.

(21) Appl. No.: 15/547,222

(22) PCT Filed: Jan. 28, 2016

(86) PCT No.: PCT/FI2016/050045
§ 371 (c)(1),
(2) Date: Jul. 28, 2017

(87) PCT Pub. No.: WO2016/124815
PCT Pub. Date: Aug. 11, 2016

(65) Prior Publication Data
US 2018/0019450 A1    Jan. 18, 2018

(30) Foreign Application Priority Data
Feb. 6, 2015 (EP) .................. 15154047

(51) Int. Cl.
*H01M 2/08* (2006.01)
*H01M 14/00* (2006.01)
(Continued)

(52) U.S. Cl.
CPC ........... *H01M 2/08* (2013.01); *H01M 2/026* (2013.01); *H01M 2/0267* (2013.01);
(Continued)

(58) Field of Classification Search
CPC .................. H01M 6/32; H01M 6/34
See application file for complete search history.

(56) References Cited

U.S. PATENT DOCUMENTS

| 4,598,273 A | 7/1986 | Bryan, Jr. et al. |
| 5,796,345 A | 8/1998 | Leventis et al. |
(Continued)

FOREIGN PATENT DOCUMENTS

| EP | 3007266 A1 | 4/2016 |
| EP | 3016178 A1 | 5/2016 |
(Continued)

OTHER PUBLICATIONS

Non-Final Office action received for corresponding U.S. Appl. No. 15/547,625, dated Jan. 17, 2018, 19 pages.
(Continued)

*Primary Examiner* — Matthew J Merkling
(74) *Attorney, Agent, or Firm* — Harrington & Smith

(57) ABSTRACT

An apparatus comprising: one or more cells, each cell comprising: a proton conductor region configured to conduct proton charge carriers; a electron conductor region configured to conduct electrons; a first electrode associated with one of the proton conductor region and the electron conductor region; and a second electrode associated with the other of the proton conductor region and the electron conductor region; a removable barrier layer that is impermeable to water vapor extending over and protecting the one or more cells from water vapor; and a buffer layer that is permeable to water vapor between the one or more cells and the barrier layer.

18 Claims, 2 Drawing Sheets

Figure 1:
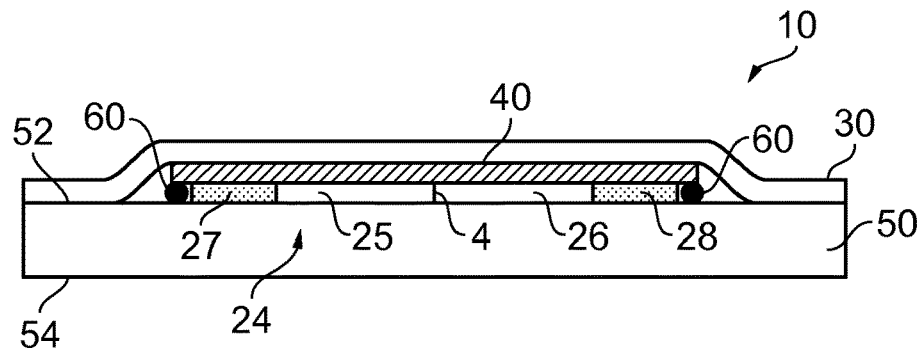

(51) Int. Cl.
H01M 2/02 (2006.01)
H01M 4/583 (2010.01)
(52) U.S. Cl.
CPC .......... H01M 4/583 (2013.01); H01M 14/00 (2013.01); *H01M 2002/0297* (2013.01); *H01M 2220/30* (2013.01)

(56) References Cited

U.S. PATENT DOCUMENTS

| | | | |
|---|---|---|---|
| 8,810,996 B2 | 8/2014 | Lee et al. | |
| 9,728,771 B2 | 8/2017 | Wei et al. | |
| 2005/0137542 A1 | 6/2005 | Underchill et al. | |
| 2009/0303052 A1 | 12/2009 | Aklepi et al. | |
| 2009/0311567 A1* | 12/2009 | Visco | H01M 2/1673 429/403 |
| 2011/0169650 A1 | 7/2011 | Holloway et al. | |
| 2012/0148882 A1* | 6/2012 | Bakker | H01M 6/32 429/52 |
| 2012/0153179 A1 | 6/2012 | Tew | |
| 2012/0251886 A1 | 10/2012 | Yushin et al. | |
| 2014/0285866 A1 | 9/2014 | Nguyen | |
| 2015/0228986 A1* | 8/2015 | Wang | H01M 6/34 429/118 |
| 2016/0223490 A1 | 8/2016 | Astley et al. | |

FOREIGN PATENT DOCUMENTS

| | | |
|---|---|---|
| EP | 3016179 A1 | 5/2016 |
| WO | 03/078300 | 9/2003 |
| WO | 2010/033087 A1 | 3/2010 |
| WO | 2016/024035 A1 | 2/2016 |

OTHER PUBLICATIONS

Yu et al., "Self-Powered Humidity Sensor Based on Graphene Oxide Composite Film Intercalated by Poly (Sodium 4-Styrenesulfonate)", ACS Applied Materials Interfaces, No. 6, vol. 11, 2014, pp. 8320-8326.

Final Office action received for corresponding U.S. Appl. No. 15/547,625, dated Jun. 19, 2018, 21 pages.

International Search Report and Written Opinion received for corresponding Patent Cooperation Treaty Application No. PCT/FI2016/050045, dated Jun. 15, 2016, 10 pages.

Feliciano, "Color Changing Plastics for Food Packaging", Semantic scholar, 2009, pp. 1-13.

"Reading Fresh-Check® Time Temperature Indicators", Fresh-check, Retrieved on Aug. 1, 2017, Webpage available at : http://www.fresh-check.com/reading.asp.

Yao et al., "The Effect of Ambient Humidity on the Electrical Properties of Graphene Oxide Films", Nanoscale Research Letters, vol. 7, No. 363, 2012, pp. 1-7.

Vanderroost et al., "Intelligent Food Packaging: The NextGeneration", Trends in Food Science & Technology, vol. 39, 2014, pp. 47-62.

Show et al., "Anticorrosion Coating of Carbon Nanotube/Polytetrafluoroethylene Composite Film on the Stainless Steel Bipolar Plate for Proton Exchange Membrane Fuel Cells", Journal of Nanomaterials, 2013, pp. 1-7.

"An Impermeable Wrap for Future Electronics", Internano, Retrieved on Jul. 11, 2017, Webpage available at: http://www.internano.org/node/510.

Extended European Search Report received for corresponding European Patent Application No. 15154047.3, dated Jun. 9, 2015, 6 pages.

Extended European Search Report received for corresponding European Patent Application No. 15154046.5, dated Aug. 6, 2015, 5 pages.

International Search Report and Written Opinion received for corresponding Patent Cooperation Treaty Application No. PCT/FI2016/050042, dated May 2, 2016, 10 pages.

Office action received for corresponding European Patent Application No. 15154046.5, dated Jul. 25, 2017, 4 pages.

\* cited by examiner

APPARATUS COMPRISING PROTON BATTERY CELLS AND A REMOVABLE BARRIER LAYER

RELATED APPLICATION

This application was originally filed as PCT Application No. PCT/FI2016/050045 filed Jan. 28, 2016 which claims priority benefit from EP Patent Application No. 15154047.3, filed Feb. 6, 2015.

TECHNOLOGICAL FIELD

Embodiments of the present invention relate to an apparatus and a method. In particular, they relate to protecting an apparatus so that it can operate as intended when required.

BACKGROUND

It may be desirable for an apparatus to operate as intended when required.

BRIEF SUMMARY

According to various, but not necessarily all, embodiments of the invention there is provided an apparatus comprising:
one or more cells, each cell comprising:
a proton conductor region;
a electron conductor region;
a first electrode associated with one of the proton-conductor region and the electron conductor region; and
a second electrode associated with the other of the proton-conductor region and the electron-conductor region;
a removable barrier layer that is impermeable to water vapor extending over and protecting the one or more cells from water vapor; and
a buffer layer that is permeable to water vapor between the one or more cells and the barrier layer.

According to various, but not necessarily all, embodiments of the invention there is provided a method comprising:
forming on the substrate first electrode(s) of the one or more cells;
forming on the substrate second electrode(s) of the one or more cells;
curing to remove water vapor;
forming one or more proton conductor regions, in contact with the first electrode(s);
forming one or more electron conductor regions, in contact with the second electrode(s);
adhering a buffer layer that is permeable to water vapor over the one or more cells using at least a perimeter of adhesive that circumscribes the one or more cells formed by the first electrode(s), the second electrode(s), the one or more proton conductor regions and the one or more electron conductor regions; and
reversibly attaching a removable barrier layer that is impermeable to water vapor to the substrate to protectively seal the one or more cells from environmental water vapor.

BRIEF DESCRIPTION

Figure 2:
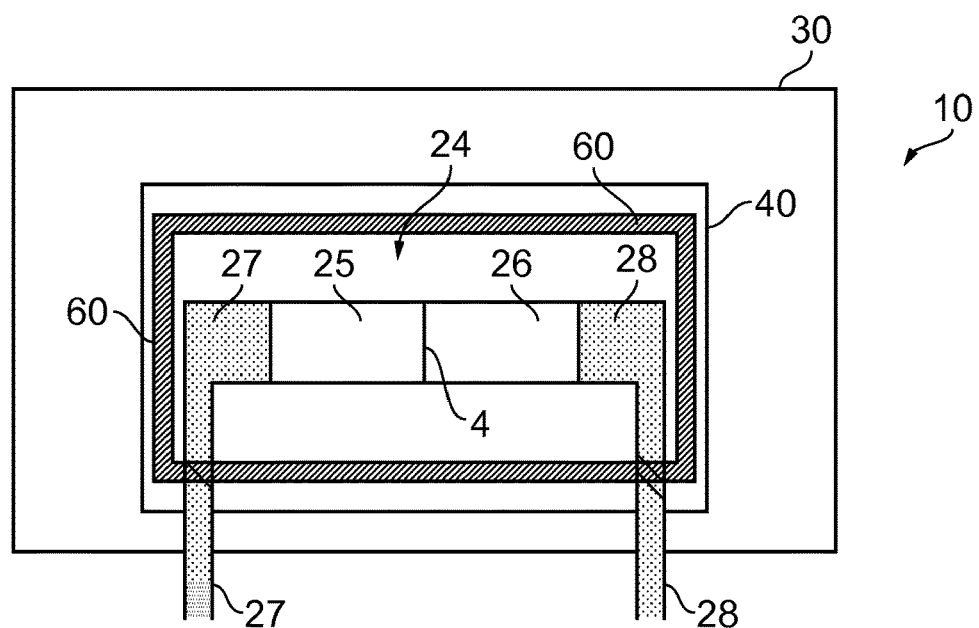
Figure 3:
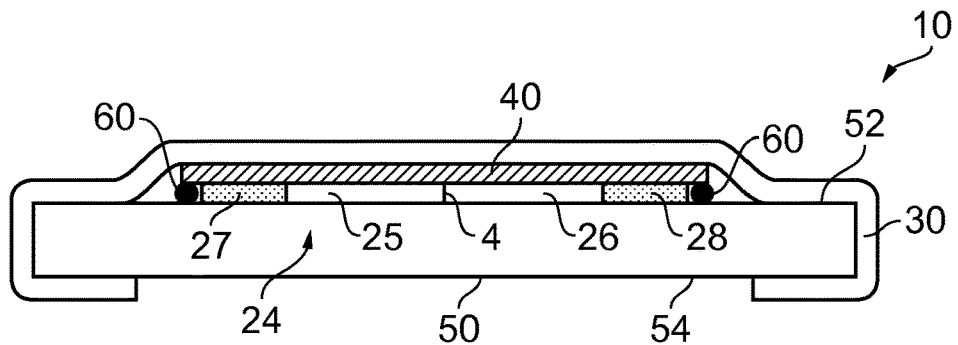
Figure 4A:
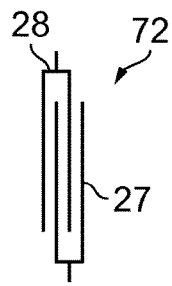
Figure 4B:
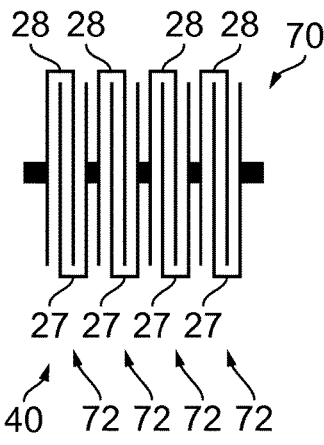
Figure 4C:
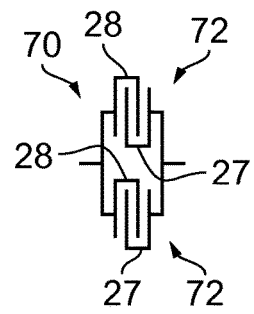
Figure 5:
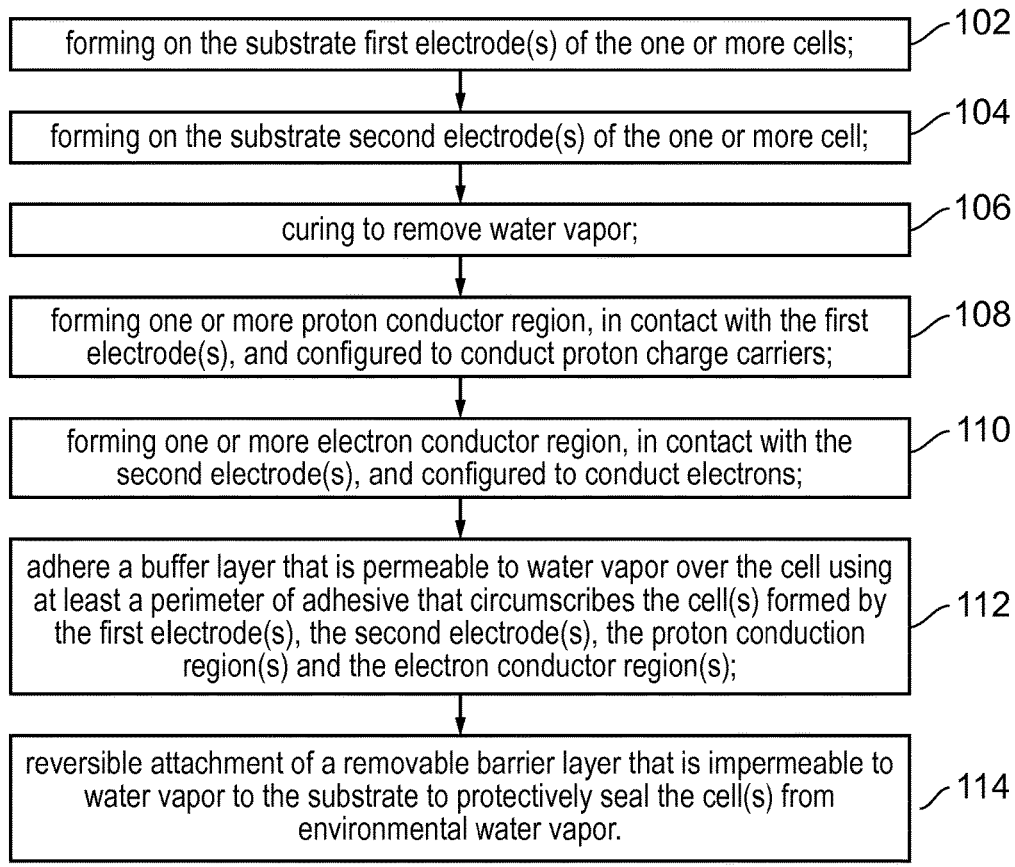

For a better understanding of various examples that are useful for understanding the brief description, reference will now be made by way of example only to the accompanying drawings in which:

FIGS. 1 and 2 illustrates, in cross-sectional and plan views, an example of an apparatus comprising one or more cells;
FIG. 3 illustrates another example of the apparatus with a wrap-around barrier layer;
FIG. 4A illustrates an example of the apparatus that has interdigitated first electrodes and second electrodes;
FIG. 4B illustrates an example of the apparatus that has battery cells connected in series;
FIG. 4C illustrates an example of the apparatus that has battery cells connected in parallel; and
FIG. 5 illustrates an example of a manufacturing method.

DETAILED DESCRIPTION

FIGS. 1 to 4 illustrate examples of an apparatus 10. The apparatus 10 comprises one or more cells 24.

Each cell 24 comprises: a proton conductor region 25 configured to conduct proton charge carriers; an electron conductor region 26 configured to conduct electrons; a first electrode 27 associated with the proton conductor region 25; and a second electrode 28 associated with the electron conductor region 26.

In some but not necessarily all examples, the proton conductor region 25 may comprise a graphene derivative and/or comprise graphene oxide and/or comprise charge-donating functional groups comprising one or more of carboxyl, hydroxyl, and epoxy. Such a proton conductor region 25 may be configured to generate and conduct protons in the presence of water.

In some but not necessarily all examples, the electron conductor region 26 may comprise a graphene derivative different to that used in the proton-conductor region 25 such as, for example, reduced graphene oxide and/or comprise conjugated polymer.

The first electrodes 27 and second electrodes 28 operate as charge collectors and may be formed from metallic material such as, for example, silver or copper. One or both electrodes may comprise organic materials such as carbon based electrodes or other conductive materials. The first electrodes 27 and/or the second electrodes 28 may be transparent.

In some but not necessarily all examples, the proton conductor region(s) 25 may be formed from printed ink and/or the electron conductor region(s) 26 may be formed from printed ink.

The cell 24 or, if more than one cell 24, some or all of the cells 24 may be two-dimensional, that is the first electrode 27 and the second electrode 28 forming a cell 24 lie in the same common two-dimensional plane. The proton conductor region 25 and the electron conductor region 26 will also lie in the same two-dimensional plane.

The apparatus 10 additionally comprises a removable barrier layer 30 that is impermeable to water vapor extending over and protecting the proton conductor region(s) 25 of the cell(s) 24 from water vapor. The removable barrier layer 30 prevents or restricts the generation of protons until the removable barrier layer 30 is removed.

The apparatus 10 additionally comprises a buffer layer 40 that is permeable to water vapor between the proton conductor region(s) 25 of the cell(s) 24 and the barrier layer 30. The buffer layer 40 protects the cell(s) 24 during removal of the removable barrier layer 30.

In some but not necessarily all examples, the apparatus 10 may be a portable energy storage device. In this example, but not necessarily all examples, the one or more cells 24 of the apparatus 10 may be one or more proton battery cells 24.

The one or more proton battery cells 24 are activated when water vapor reaches the proton conductor region(s) 25 of the cell(s) 24 after removal of the removable barrier layer 30.

FIGS. 1 and 2 illustrates a particular example of an apparatus 10 comprising one or cells 24. FIG. 1 illustrates the apparatus 10 using a cross-sectional view and FIG. 2 illustrates the apparatus 10 using a plan view.

It will be assumed in the following that the cells 24 are proton battery cells 24.

The apparatus 10 comprises a removable barrier layer 30 that is impermeable to water vapor extending over and protecting the proton battery cell(s) 24 from water vapor.

The apparatus 10 additionally comprises a buffer layer 40 that is permeable to water vapor between the proton battery cell(s) 24 and the barrier layer 30.

The proton battery cell(s) 24 may be supported by a substrate 50.

The buffer layer 40 provides mechanical protection to one or more proton cells 24 when the removable barrier layer 30 is removed from the apparatus 10.

The buffer layer 40 may be a meshed material. The buffer layer 40 may be hydrophobic and/or non-stick. The buffer layer 40 may be a breathable textile.

In the example illustrated, the buffer layer 40 directly contacts the proton battery cell(s) 24. In the example illustrated, the buffer layer 40 overlies and directly contacts the first electrode 27, the proton conductor region 25, the electron conductor region 26 and the second electrode 28.

In this example, but not necessarily all examples, the buffer layer 40 is adhered to the substrate 50 using a circumscribing perimeter of adhesive 60. The adhesive surrounds, in two-dimensions, the proton battery cell(s) 24.

In this example, but not necessarily all examples, the buffer layer 40 contacts but is not adhered to the proton battery cell(s) 24.

The removable barrier layer 30 does not contact the proton battery cell(s) 24. The buffer layer 40 operates as a buffer between the removable barrier layer 30 and the proton battery cell(s) 24, protecting the proton battery cell(s) 24 from damage when the removable barrier layer 30 is removed from the apparatus 10.

In the example illustrated, the removable barrier layer 30 overlies and contacts both the buffer layer 40 and the substrate 50.

Where the removable barrier layer 30 and the substrate 50 contact, van der Waals interactions are formed between the removable barrier layer 30 and the substrate 50.

Where the removable barrier layer 30 and the buffer layer 40 contact, van der Waals interactions may or may not be formed between the removable barrier layer 30 and the buffer layer 40.

The removable barrier layer 30 attaches strongly to the substrate 50 but does not attach strongly to the buffer layer 40.

The van der Waals interactions formed between the removable barrier layer 30 and the substrate 50 are reversible to remove the barrier layer 30 and also to reattach the barrier layer 30 after it has been removed.

The van der Waals interactions formed between the removable barrier layer 30 and the substrate 50 are disrupted by peeling the removable barrier layer 30 from the substrate 50.

The removable barrier layer 30 seals the proton battery cell(s) 24 from water vapor which would activate the proton battery cell. The removable barrier layer 30 therefore enables the proton battery cell(s) 24 to be stored in a de-activated state. The proton battery cell(s) 24 is activated when a user removes the removable barrier layer 30. It will therefore be appreciated that the removable barrier layer 30 increases the shelf-life of the proton battery cell(s) 24.

In the example illustrated, but not necessarily all examples, the removable barrier layer 30 comprises polydimethylsiloxane (PDMS) and the substrate 50 comprises polyethylene naphthalene (PEN).

The removable barrier layer 30 may be flexible. This allows it to adapt to the shape of the proton battery cell(s) 24 and buffer layer 40.

The buffer layer 40 may be flexible. This allows it to adapt to the shape of the proton battery cell(s) 24.

In addition, the substrate 50, the proton battery cell(s) 24 and the buffer layer 40 may be flexible. This allows the whole apparatus 10 to be flexible.

The substrate 50 may comprise a thin film/coating to tailor the surface properties of the substrate 50 e.g. a fused silica layer or hydrophilic layer.

FIG. 3 illustrates another example of the apparatus 10 similar to that illustrated in FIG. 1. The substrate 50 comprises a front side 52 and a back side 54, The front side 52 supports the one or more proton battery cells 24. The removable barrier layer 30 extends over the one or more proton battery cells 24, contacts the substrate 50 on the front side 52 of the substrate 50, an edge of the substrate between the front side 52 and the back side 54, and wraps around the substrate 50 to contact at least some of the back side 54 of the substrate 50. The removable barrier layer 30 may also extend to cover the entire back side 54 of the substrate 50.

In the illustrated example, the one or more proton battery cells 24 are only on the front side 52 of the substrate 50, however, in other examples one or more proton battery cells 24 may be on the front side 52 of the substrate 50 and or the back side 54 of the substrate 50. Where proton battery cells 24 are on both the front side 52 and the back side 54 of the substrate 50 a single removable barrier layer 30 may extend over the proton battery cells 24 on both the front side 52 and the back side 54 of the substrate 50.

FIG. 4A illustrates an example of an apparatus 10 that has an example of interdigitated first electrodes 27 and second electrodes 28. The apparatus 10 is as previously described.

The apparatus 10 may, for example, comprise a single proton battery cell 24 that has a single first electrode 27 and a single second electrode 28, where the first electrode 27 and the second electrode 28 are interdigitated. In this case, a proton conductor—electron conductor junction would follow the interdigitated gap between the first electrode 27 and the second electrode 28.

Each of FIGS. 4A and 4C illustrate an example of an apparatus 10 comprising a plurality 70 of proton battery cells 24 each of which has a first electrode 27 and a second electrode 28.

In these examples, battery units are provided by meandering proton battery cells 72. Each meandering proton battery cell 72 operates in a manner similar to three proton battery cells 24, connected in physical and electrical parallel. The meandering proton battery cell 72 is formed using a single U shaped first electrode 27 and a single U shaped second electrode 28, where the U shaped first electrode 27 and the U shaped second electrode 28 are interdigitated as illustrated.

In FIG. 4B, the apparatus 10 comprises four meandering proton battery cells 72. Each of the four meandering proton battery cells 72 is connected in electrical series to the next meandering proton battery cell 72 in the series of four meandering proton battery cells 72.

In FIG. 4C, the apparatus 10 comprises two meandering proton battery cells 72. Each of the two meandering proton battery cells 72 is connected in electrical parallel to an adjacent meandering proton battery cell 72.

It will be appreciated that each proton battery cell 24 (or meandering proton battery cell 72) is a battery unit and the battery units may be connected in series to achieve a controlled voltage as illustrated in FIG. 4B, or connected in parallel to achieve a controlled electrical current as illustrated in FIG. 4C or connected as a network of battery units in series and/or parallel to achieve both a controlled voltage and a controlled electric current.

FIG. 5 illustrates an example of a manufacturing method 100 comprising at block 102, forming on the substrate 50 first electrode(s) 27 of the one or more cells 24;

at block 104, forming on the substrate 50 second electrode(s) 28 of the one or more cells 24;

at block 106, curing to remove water vapor;

at block 108, forming one or more proton conductor region 25, in contact with and adjacent the first electrode(s), and configured to conduct proton charge carriers;

at block 110, forming one or more electron conductor regions 26, in contact with and adjacent the second electrode(s) 28, and configured to conduct electrons;

at block 112, adhere a buffer layer 40 that is permeable to water vapor over the cell(s) 24 using at least a perimeter of adhesive that circumscribes the cell(s) 24 formed by the first electrode(s) 27, the second electrode(s) 28, the proton conductor region 25 and the electron conductor region 26;

at block 114, reversibly attaching a removable barrier layer 30 that is impermeable to water vapor to the substrate to protectively seal the cell(s) 24 from environmental water vapor.

In this example, but not necessarily all examples, the one or more cells 24 are proton battery cells 24.

In some but not necessarily all examples, the first electrode(s) 27 and the second electrodes 28 may be formed simultaneously, for example, by printing.

The first electrodes(s) 27 and the second electrode(s) 28 may be formed from silver nanoparticle based inks using direct printing or masked deposition, for example.

The electrodes may, for example, be dried at 130° C. for 30 minutes-2 hours during curing.

In some but not necessarily all examples, the proton conductor regions 25 and/or the electron conductor regions 26 may be formed by printing.

In some but not necessarily all examples, a membrane or junction 4 may be formed between the proton conductor regions 25 and the electron conductor regions 26.

Optically clear adhesive may be used to define a perimeter 60 circumscribing the proton battery cells 24 formed by the first electrode(s) 27, the second electrode(s) 28, the proton conduction region 25 and the electron conductor region 26. Other forms of lamination adhesives (including to but not limited to tapes, double sided tapes) may be used to define the perimeter 60 circumscribing the proton battery cells 24.

At block 114, the structure formed may be flipped and placed on top of a removable barrier layer 30 that is impermeable to water vapor. The removable barrier layer 30 extends over and seals the proton battery cell(s) 24 from water vapor.

The removable barrier layer 30 may be formed from PDMS and may have a thickness of about 75 um or more or less.

In some but not necessarily all examples, the removable barrier layer 30 may be wrapped around the substrate 50 to contact the back side 54 of the substrate as illustrated in FIG. 3.

A final attaching and lamination block may occur after block 114; this applies pressure to form or improve impermeable but breakable interactions between the removable barrier layer 30 and the substrate 50. The lamination technique can be controlled by using pressure, speed and temperature and a combination of each in some cases.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although examples of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
    one or more cells, each cell comprising: a proton conductor region, comprising graphene oxide, configured to conduct proton charge carriers;
    a electron conductor region, comprising reduced graphene oxide, configured to conduct electrons;
    a first electrode adjacent with one of the proton conductor region and the electron conductor region;
    a second electrode adjacent with the other of the proton conductor region and the electron conductor region;

a removable barrier layer that is impermeable to water vapor extending over and protecting the one or more cells from water vapor; and a buffer layer that is permeable to water vapor between the one or more cells and the barrier layer.

2. An apparatus as claimed in claim 1, wherein the removable barrier layer is flexible.

3. An apparatus as claimed in claim 1, further comprising:
a substrate supporting the one or more cells, wherein the removable barrier layer contacts the substrate and forms attractive interactions with at least the substrate and wherein the removable barrier layer contacts the buffer layer.

4. An apparatus as claimed in claim 3, wherein the removable barrier layer attaches more strongly to the substrate than the buffer layer.

5. An apparatus as claimed in claim 3, wherein the attractive interactions formed between the removable barrier layer and the substrate are reversible so to remove the barrier layer and reattach the barrier layer.

6. An apparatus as claimed in claim 3, wherein the attractive interactions formed between the removable barrier layer and the substrate are disrupted by peeling the removable barrier layer from the substrate.

7. An apparatus as claimed in claim 3, wherein the substrate is flexible.

8. An apparatus as claimed in claim 3, wherein a substrate comprises a front side and a back side, wherein the front side supports the one or more cells and wherein the removable barrier layer extends over the one or more cells and wraps around the substrate to contact at least the back side of the substrate.

9. An apparatus as claimed in claim 1, wherein the removable barrier layer comprises polydimethylsiloxane and wherein the buffer layer comprises polyethylene naphthalene.

10. An apparatus as claimed in claim 1, wherein the buffer layer provides mechanical protection to one or more proton cells when the removable barrier layer is removed from the apparatus.

11. An apparatus as claimed in claim 1, wherein the buffer layer is flexible.

12. An apparatus as claimed in claim 1, wherein the buffer layer is meshed material.

13. An apparatus as claimed in claim 1, wherein the buffer layer is hydrophobic and/or non-stick.

14. An apparatus as claimed in claim 1, wherein the buffer layer is breathable textile.

15. An apparatus as claimed in claim 1, wherein the proton conductor region is configured to conduct protons in the presence of water.

16. An apparatus as claimed in claim 1, wherein the proton conductor region is formed using printed ink.

17. A battery comprising:
one or more battery cells, each battery cell comprising at least one of:
a proton conductor region, comprising graphene oxide, configured to conduct proton charge carriers;
a electron conductor region, comprising reduced graphene oxide, configured to conduct electrons;
a first electrode adjacent with one of the proton conductor region and the electron conductor region;
a second electrode adjacent with the other of the proton conductor region and the electron conductor region;
a removable barrier layer that is impermeable to water vapor extending over and protecting the one or more cells from water vapor; and
a buffer layer that is permeable to water vapor between the one or more cells and the barrier layer.

18. A battery as claim in claim 17, wherein the battery is a portable energy storage device.

* * * * *